Patented Dec. 2, 1930

1,783,694

UNITED STATES PATENT OFFICE

HENRY BLUMENBERG, JR., OF MOAPA, NEVADA, AND JOHN H. BLUMENBERG, OF HUNTINGTON PARK, CALIFORNIA

PROCESS OF PRODUCING ORGANIC IRON COMPOUNDS AND THE RESULTING PRODUCT

No Drawing. Application filed August 31, 1926. Serial No. 132,893.

Our invention relates to a process of making a plant food and the resulting product, and in particular has for its object the production of an organic iron compound suitable as a non-toxic plant stimulant or fertilizer.

As well known, iron is required in plants, especially in the production of brilliant colors in flowers.

Our invention consists of the steps of the process and the resulting product hereinafter described and claimed.

We take the iron sulphates, such as ferrous or ferric, or a mixture of the two, and dissolve the same in water, making a 20 per cent solution, and saturate therein a cellulose compound such as sawdust, rice hulls, ground corn cobs or the like. After separation from the solution the sawdust is dehydrated by any suitable means and the temperature is gradually raised to about 120° C. In the course of two to four hours, even at this low temperature, the cellulose material will assume a dark brown or black color.

The iron sulphate reacts on the cellulose and lignin of the sawdust or other cellulose material forming soluble carbo-hydrates such as invert sugars and dextrins. We are not prepared to state the exact chemical reactions; probably the iron sulphate decomposes in the presence of the cellulose liberating the $SO_3$ radical which reacts on the cellulose converting the same into soluble sugars and dextrins, combining with the iron to form neutral iron compounds.

It will be obvious that our organic iron compound may be used either alone as a plant stimulant or mixed with other fertilizing materials.

Various changes may be made in the steps of the process by those skilled in the art without departing from the spirit of our invention as claimed.

We claim:

1. A method of making an organic iron compound suitable as a non-toxic plant stimulant comprising treating comminuted cellulose material with an aqueous solution of iron sulphate, and heating the impregnated cellulose material until the same assumes a dark brown or black color.

2. A method of making an organic iron compound suitable as a non-toxic plant stimulant comprising treating sawdust with an aqueous solution of iron sulphate, and heating the impregnated sawdust until the same assumes a dark brown or black color.

3. A method of making an organic iron compound suitable as a non-toxic plant stimulant comprising treating sawdust with an aqueous solution of iron sulphate, and heating the impregnated sawdust up to 120° C. until the same assumes a dark brown or black color.

4. A plant stimulant comprising cellulose material impregnated with an aqueous solution of iron sulphate and heated up to 120° C. until the mixture assumes a dark brown or black color.

In testimony whereof we have signed our names to this specification.

HENRY BLUMENBERG, JR.
JOHN H. BLUMENBERG.